United States Patent
Liu et al.

(10) Patent No.: US 12,356,222 B2
(45) Date of Patent: Jul. 8, 2025

(54) METHOD AND TERMINAL DEVICE FOR MEASUREMENT CONTROL

(71) Applicant: Telefonaktiebolaget LM Ericsson (publ), Stockholm (SE)

(72) Inventors: Chunhui Liu, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 17/794,961

(22) PCT Filed: Jan. 23, 2020

(86) PCT No.: PCT/CN2020/073966
§ 371 (c)(1),
(2) Date: Jul. 23, 2022

(87) PCT Pub. No.: WO2021/147067
PCT Pub. Date: Jul. 29, 2021

(65) Prior Publication Data
US 2023/0142795 A1    May 11, 2023

(51) Int. Cl.
*H04W 24/08*  (2009.01)
*H04L 5/00*   (2006.01)
*H04W 72/0453* (2023.01)

(52) U.S. Cl.
CPC .......... *H04W 24/08* (2013.01); *H04L 5/0048* (2013.01); *H04W 72/0453* (2013.01)

(58) Field of Classification Search
CPC .. H04L 5/0048; H04W 24/08; H04W 72/0453
See application file for complete search history.

(56) References Cited

U.S. PATENT DOCUMENTS

| | | | |
|---|---|---|---|
| 10,237,878 B2* | 3/2019 | Liang | H04L 67/61 |
| 2004/0219912 A1* | 11/2004 | Johansson | H04W 24/02 455/424 |
| 2013/0150051 A1* | 6/2013 | Van Phan | H04W 76/14 455/437 |

(Continued)

FOREIGN PATENT DOCUMENTS

CN    106376037    2/2017

OTHER PUBLICATIONS

International Search Report and Written Opinion of the International Searching Authority, PCT/CN2020/073966, mailed Oct. 28, 2022, 6 pages.

(Continued)

*Primary Examiner* — Melanie Jagannathan
(74) *Attorney, Agent, or Firm* — Sage Patent Group

(57) ABSTRACT

A method and a terminal device are disclosed for measurement control. According to an embodiment, the terminal device detects, for a cell that is shared by two operators and to be measured by the terminal device, whether frequency bands used by the two operators for the cell are overlapped. When detecting that frequency bands used by the two operators for the cell are overlapped, the terminal device performs measurement on a reference signal from one of the two operators at least at the overlapped portion of the frequency bands. The terminal device reports information about a result of the measurement to the two operators.

18 Claims, 11 Drawing Sheets

(56) References Cited

U.S. PATENT DOCUMENTS

| | | | |
|---|---|---|---|
| 2013/0235785 A1 | 9/2013 | Sébire et al. | |
| 2014/0086177 A1* | 3/2014 | Adjakple | H04W 74/04 |
| | | | 370/329 |
| 2015/0319701 A1* | 11/2015 | Ng | H04W 8/005 |
| | | | 370/311 |
| 2016/0037550 A1 | 2/2016 | Barabell et al. | |
| 2016/0088487 A1* | 3/2016 | Yu | H04W 36/06 |
| | | | 370/329 |
| 2017/0230818 A1 | 8/2017 | Park et al. | |
| 2017/0251480 A1* | 8/2017 | Liang | H04L 5/00 |
| 2017/0290023 A1* | 10/2017 | Zhu | H04L 5/0032 |
| 2017/0325115 A1* | 11/2017 | Matsumoto | H04W 16/14 |
| 2020/0092763 A1* | 3/2020 | Yerramalli | H04W 36/0061 |
| 2020/0322808 A1* | 10/2020 | You | H04W 24/02 |

OTHER PUBLICATIONS

ZTE et al., "Network Sharing Scenarios and Enhancement", 3GPP TSG-RAN WG3 Meeting #89, R3-151524, Aug. 24-28, 2015, 4 pages.

"RAN Sharing Solutions, Network Performance Monitoring," Accedian Networks, RAN Sharing Performance Monitoring, 2Q 2015, 6 pages.

* cited by examiner

METHOD AND TERMINAL DEVICE FOR MEASUREMENT CONTROL

CROSS REFERENCE TO RELATED APPLICATIONS

This application is a 35 U.S.C. § 371 national stage application of PCT International Application No. PCT/CN2020/073966 filed on Jan. 23, 2020, the disclosure and content of which is incorporated by reference herein in its entirety.

TECHNICAL FIELD

Embodiments of the disclosure generally relate to wireless communication, and, more particularly, to a method and a terminal device for measurement control.

BACKGROUND

This section introduces aspects that may facilitate better understanding of the present disclosure. Accordingly, the statements of this section are to be read in this light and are not to be understood as admissions about what is in the prior art or what is not in the prior art.

From analog through long term evolution (LTE), each generation of mobile technology has been motivated by the need to address the challenges not overcome by its predecessor. The 5th generation (5G) of mobile technology is positioned to address the demands and business beyond LTE. It is expected to enable a fully mobile and connected society, related to the tremendous growth in connectivity and density/volume of traffic that will be required in the near future.

China Telecom and China Unicom have reached a tentative agreement to jointly build a 5G network and share network infrastructure. It is possible that China Mobile may join them. The three Chinese operators co-own a tower company, China Tower Corp, which would make it easier for them to collaborate on building out all the thousands of base stations necessary for a new 5G network in China.

Generally speaking, there are various forms of network sharing, including: mast/site sharing where mobile operators use the same tower sites to co-locate equipments, but otherwise everything else is separate; radio access network (RAN) sharing where operators share all the equipments in the network as far back as the base station controller/radio network controller; and network roaming where competing operators agree to host one another's customers on their networks in certain geographic areas. The above first and third items are mainly impacted by business negotiation, while the second one may be implemented in different manners.

FIG. 1 shows two exemplary sharing scenarios for the above second item. The multi-operator core network (MOCN) defines that individual core networks are possessed by different operators, while the hardware (HW), software (SW), radio resource at radio and base band are totally shared in the manner of a predefined percentage. Multi-operator RAN (MORAN) defines that core networks and cells are separated for different operators, while radio and base band are partially or completely shared in the manner of a predefined percentage.

Furthermore, for the initial stage of 5G new radio (NR) deployment, one of most typical configuration for NR is to share spectrum resources or partially share spectrum resources with 4th generation (4G) network with the help of mix mode radio. With more and more user equipments (UEs) phasing out from 4G network and more and more UEs emerging in 5G network, spectrum resources will gradually shift from 4G to 5G, which can flexibly balance near term and long term network requirements. For example, the table below shows a configuration that China Mobile Communications Group Co., Ltd (CMCC) suggested for 2020 NR rollout. In this configuration, there will be 40 MHz spectrum shared with LTE.

| | MHz | | | | | |
|---|---|---|---|---|---|---|
| | 2515-2535 | 2535-2555 | 2555-2575 | 2575-2595 | 2595-2615 | 2615-2635 |
| CMCC bands | NR only | | | LTE/NR sharing | | LTE only |

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for measurement control.

According to a first aspect of the disclosure, there is provided a method performed by a terminal device. The method may comprise detecting, for a cell that is shared by two operators and to be measured by the terminal device, whether frequency bands used by the two operators for the cell are overlapped. The method may further comprise, when detecting that frequency bands used by the two operators for the cell are overlapped, performing measurement on a reference signal from one of the two operators at least at the overlapped portion of the frequency bands. The method may further comprise reporting information about a result of the measurement to the two operators.

In this way, the power consumption at the terminal device can be reduced.

In an embodiment of the disclosure, the cell to be measured by the terminal device may be a cell serving the terminal device, or a neighboring cell of the cell serving the terminal device.

In an embodiment of the disclosure, the method may further comprise determining whether a same neighboring cell is to be measured for the two operators. The method may further comprise, when determining that a same neighboring cell is to be measured for the two operators, performing measurement on the same neighboring cell only one time. The method may further comprise reporting information indicating the same result of the measurement to the two operators.

In an embodiment of the disclosure, the two frequency bands may be the same with each other. The measurement may be performed at the same frequency band. The information sent to the two operators may indicate the same result of the measurement.

In an embodiment of the disclosure, the frequency bands may be a first frequency band used by a first operator and a second frequency band used by a second operator, and the overlapped portion of the frequency bands may be the second frequency band. The measurement may be performed at the first frequency band. The information sent to the second operator may indicate part of the result of the measurement corresponding to the second frequency band.

In an embodiment of the disclosure, the two frequency bands may be staggered from each other with a portion overlapped therebetween. The measurement may be performed at the overlapped portion. The information sent to the two operators may contain the same result of the measurement.

In an embodiment of the disclosure, discontinuous reception (DRX) periods of the two operators may be completely overlapped with each other. The measurement may be performed at one of measurement opportunities for the two operators, which is closest to the earliest one of reporting occasions for the two operators.

In an embodiment of the disclosure, the frequency bands may be a first frequency band used by a first operator and a second frequency band used by a second operator, and a second DRX period of the second operator may fall within a first DRX period of the first operator. The measurement may be performed at a measurement opportunity for the second operator, without using measurement opportunity for the first operator.

In an embodiment of the disclosure, DRX periods of the two operators may be staggered from each other with a portion overlapped therebetween. The measurement may be performed at a measurement opportunity for one of the two operators whose DRX period starts earlier.

In an embodiment of the disclosure, detecting whether the frequency bands are overlapped may comprise obtaining, from a server, information about radio and spectrum sharing. Detecting whether the frequency bands are overlapped may comprise determining whether the frequency bands are overlapped based on the obtained information.

In an embodiment of the disclosure, detecting whether the frequency bands are overlapped may comprise determining a first channel matrix of a first channel for a first operator, based on measurement on the reference signal carried by the first channel. Detecting whether the frequency bands are overlapped may comprise determining a second channel matrix of a second channel for a second operator, based on measurement on the reference signal carried by the second channel. Detecting whether the frequency bands are overlapped may comprise determining whether the two channels are the same channel based on the two channel matrixes.

In an embodiment of the disclosure, determining whether the two channels are the same channel based on the two channel matrixes may comprise calculating a product between the first channel matrix and a conjugate transpose matrix of the second channel matrix. Determining whether the two channels are the same channel based on the two channel matrixes may comprise calculating a ratio between a sum of powers of diagonal elements of the product and a sum of powers of all elements of the product. Determining whether the two channels are the same channel based on the two channel matrixes may comprise, when the ratio is above a predetermined threshold, determining that the two channels are the same channel.

In an embodiment of the disclosure, the reference signal may be a channel state information reference signal (CSI-RS) or a tracking reference signal (TRS).

In an embodiment of the disclosure, the method may further comprise providing user data and forwarding the user data to a host computer via the transmission to a base station.

According to a second aspect of the disclosure, there is provided a terminal device. The terminal device may comprise at least one processor and at least one memory. The at least one memory may contain instructions executable by the at least one processor, whereby the terminal device may be operative to detect, for a cell that is shared by two operators and to be measured by the terminal device, whether frequency bands used by the two operators for the cell are overlapped. The terminal device may be further operative to, when detecting that frequency bands used by the two operators for the cell are overlapped, perform measurement on a reference signal from one of the two operators at least at the overlapped portion of the frequency bands. The terminal device may be further operative to report information about a result of the measurement to the two operators.

In an embodiment of the disclosure, the cell to be measured by the terminal device may be a cell serving the terminal device, or a neighboring cell of the cell serving the terminal device.

In an embodiment of the disclosure, the instructions may be executable by the at least one processor, whereby the terminal device may be further operative to determine whether a same neighboring cell is to be measured for the two operators. The terminal device may be further operative to, when determining that a same neighboring cell is to be measured for the two operators, perform measurement on the same neighboring cell only one time. The terminal device may be further operative to report information indicating the same result of the measurement to the two operators.

In an embodiment of the disclosure, the two frequency bands may be the same with each other. The measurement may be performed at the same frequency band. The information sent to the two operators may indicate the same result of the measurement.

In an embodiment of the disclosure, the frequency bands may be a first frequency band used by a first operator and a second frequency band used by a second operator, and the overlapped portion of the frequency bands may be the second frequency band. The measurement may be performed at the first frequency band. The information sent to the second operator may indicate part of the result of the measurement corresponding to the second frequency band.

In an embodiment of the disclosure, the two frequency bands may be staggered from each other with a portion overlapped therebetween. The measurement may be performed at the overlapped portion. The information sent to the two operators may contain the same result of the measurement.

In an embodiment of the disclosure, DRX periods of the two operators may be completely overlapped with each other. The measurement may be performed at one of measurement opportunities for the two operators, which is closest to the earliest one of reporting occasions for the two operators.

In an embodiment of the disclosure, the frequency bands may be a first frequency band used by a first operator and a second frequency band used by a second operator, and a second DRX period of the second operator may fall within a first DRX period of the first operator. The measurement may be performed at a measurement opportunity for the second operator, without using measurement opportunity for the first operator.

In an embodiment of the disclosure, DRX periods of the two operators may be staggered from each other with a portion overlapped therebetween. The measurement may be performed at a measurement opportunity for one of the two operators whose DRX period starts earlier.

In an embodiment of the disclosure, the instructions may be executable by the at least one processor, whereby the terminal device may be operative to detect whether the frequency bands are overlapped by obtaining, from a server, information about radio and spectrum sharing. The terminal device may be operative to detect whether the frequency bands are overlapped by determining whether the frequency bands are overlapped based on the obtained information.

In an embodiment of the disclosure, the instructions may be executable by the at least one processor, whereby the terminal device may be operative to detect whether the frequency bands are overlapped by determining a first channel matrix of a first channel for a first operator, based on measurement on the reference signal carried by the first channel. The terminal device may be operative to detect whether the frequency bands are overlapped by determining a second channel matrix of a second channel for a second operator, based on measurement on the reference signal carried by the second channel. The terminal device may be operative to detect whether the frequency bands are overlapped by determining whether the two channels are the same channel based on the two channel matrixes.

In an embodiment of the disclosure, the instructions may be executable by the at least one processor, whereby the terminal device may be operative to determine whether the two channels are the same channel based on the two channel matrixes by calculating a product between the first channel matrix and a conjugate transpose matrix of the second channel matrix. The terminal device may be operative to determine whether the two channels are the same channel based on the two channel matrixes by calculating a ratio between a sum of powers of diagonal elements of the product and a sum of powers of all elements of the product. The terminal device may be operative to determine whether the two channels are the same channel based on the two channel matrixes by, when the ratio is above a predetermined threshold, determining that the two channels are the same channel.

In an embodiment of the disclosure, the reference signal may be a CSI-RS or a TRS.

According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided a terminal device. The terminal device may comprise a detection module for detecting, for a cell that is shared by two operators and to be measured by the terminal device, whether frequency bands used by the two operators for the cell are overlapped. The terminal device may further comprise a measurement module for, when detecting that frequency bands used by the two operators for the cell are overlapped, performing measurement on a reference signal from one of the two operators at least at the overlapped portion of the frequency bands. The terminal device may further comprise a reporting module for reporting information about a result of the measurement to the two operators.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
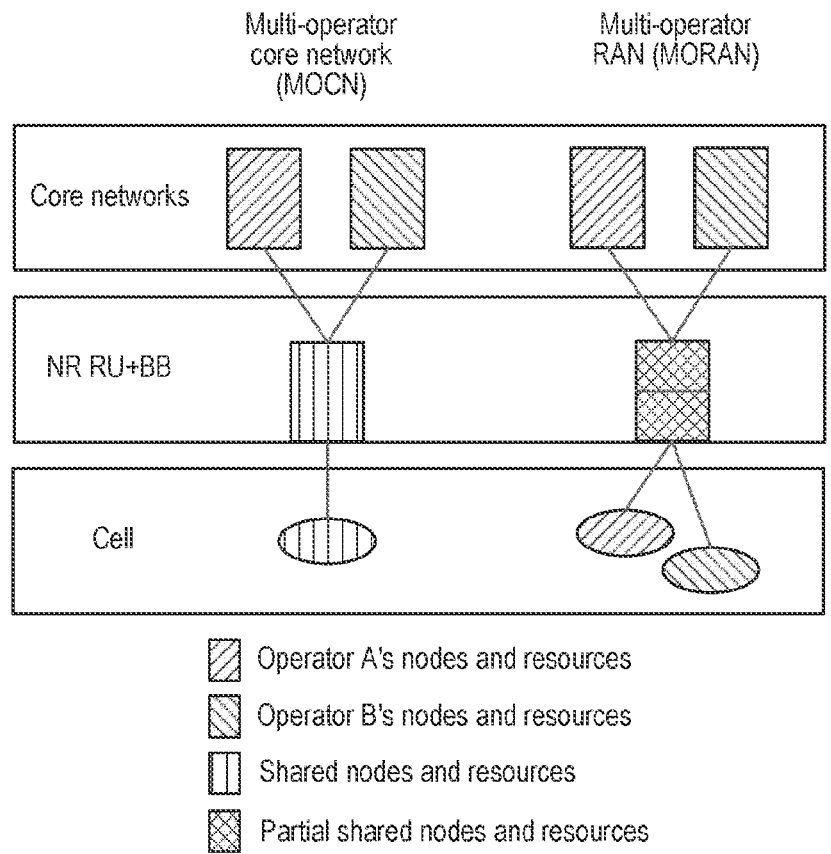
FIG. 1 is a diagram illustrating exemplary RAN sharing scenarios.

For the purpose of explanation, details are set forth in the following description in order to provide a thorough understanding of the embodiments disclosed. It is apparent, however, to those skilled in the art that the embodiments may be implemented without these specific details or with an equivalent arrangement.

References in the specification to "one embodiment", "an embodiment", "an example embodiment", and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Some of the embodiments described separately or independently hereafter may also be implemented in combination depending on various application scenarios.

As a cell is shared by multiple operators and a UE may be equipped with multiple subscriber identity module (SIM)

cards and connected to those multiple operators, RAN views this UE as multiple individual UEs and individually configures measurements. Then, the UE must do double or even triple measurements for the same cell or even the same reference signals. This causes unnecessary power consumption at the UE which is quite critical for mobile users.

The present disclosure proposes an improved solution for measurement control. The solution may be applied to a communication system including a terminal device and an access network node. For example, the access network node may be a base station such as a next generation node base station (gNB) in NR. The terminal device can communicate through a radio access communication link with the base station. The base station can provide radio access communication links to terminal devices that are within its communication service cell. Note that the communications may be performed between the terminal device and the base station according to any suitable communication standards and protocols.

The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 2:
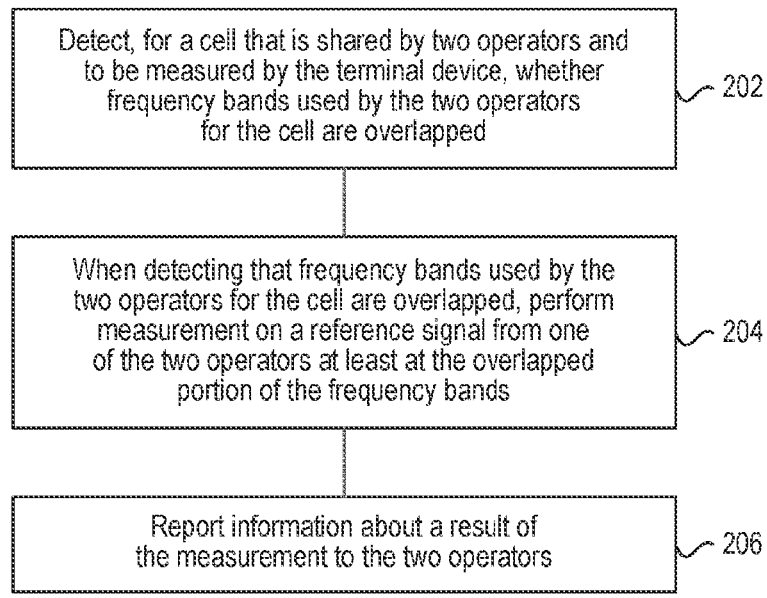
FIG. 2 is a flowchart illustrating a method implemented at a terminal device according to an embodiment of the disclosure.

Hereinafter, the solution will be described in detail with reference to FIGS. 2-16. FIG. 2 is a flowchart illustrating a method implemented at a terminal device according to an embodiment of the disclosure. At block 202, the terminal device detects, for a cell that is shared by two operators and to be measured by the terminal device, whether frequency bands (or operating bands) used by the two operators for the cell are overlapped. In other words, the terminal device detects whether the cell is shared by different operators at the same or partially overlapped frequency band. Block 202 is performed in consideration of the fact that when the terminal device is equipped with the two operators' SIM cards, it cannot explicitly know whether a cell is shared by the two operators in the mode of MOCN, dynamic spectrum sharing or even a mixed scenario, and it also cannot explicitly know whether the signals for different operators are coming from one radio. The cell to be measured by the terminal device may be a cell serving the terminal device, or a neighboring cell of the cell serving the terminal device. Note that it is possible for the cell to be shared by more than two operators. In this case, the "two operators" described in block 202 may refer to any two of the multiple operators.

Figure 3A:
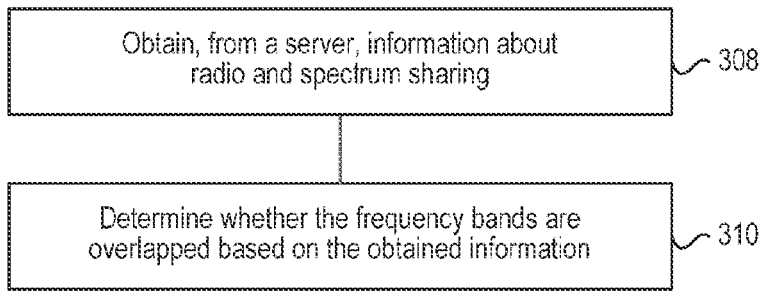
FIGS. 3A-3B are flowcharts for explaining the method of FIG. 2.
Figure 5:
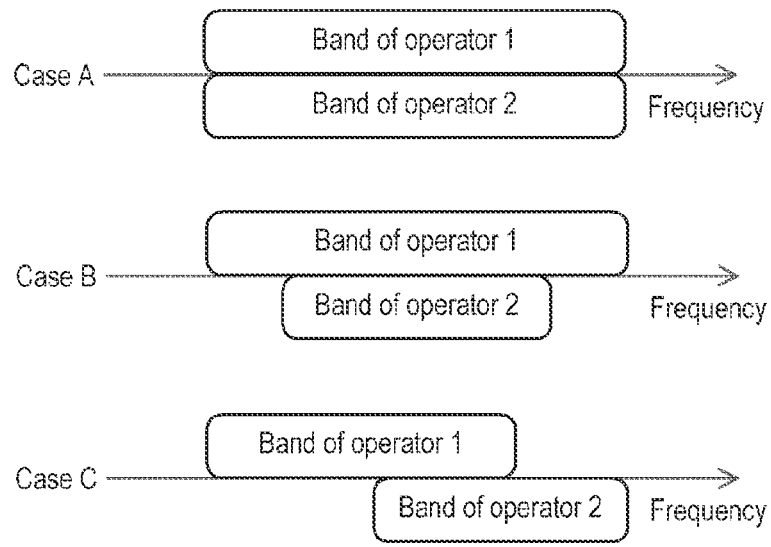
FIG. 5 is a diagram illustrating different cases of frequency band overlapping.

As an option, block 202 may be implemented as blocks 308-310 of FIG. 3A. At block 308, the terminal device obtains, from a server, information about radio and spectrum sharing. For example, such information (e.g. the base stations shared by multiple operators, the corresponding spectrums, etc.) may be available publicly through the server. The terminal device may obtain such information from the server through an application software, for example. At block 310, the terminal device determines whether the frequency bands are overlapped based on the obtained information. This determination may be made since the terminal device can be explicitly aware of such deployment of radio and spectrum sharing. For example, FIG. 5 illustrates different cases of frequency band overlapping. In case A, the two frequency bands are the same with each other. In case B, the overlapped portion of the frequency bands is the second frequency band. In case C, the two frequency bands are staggered from each other with a portion overlapped therebetween.

Figure 3B:
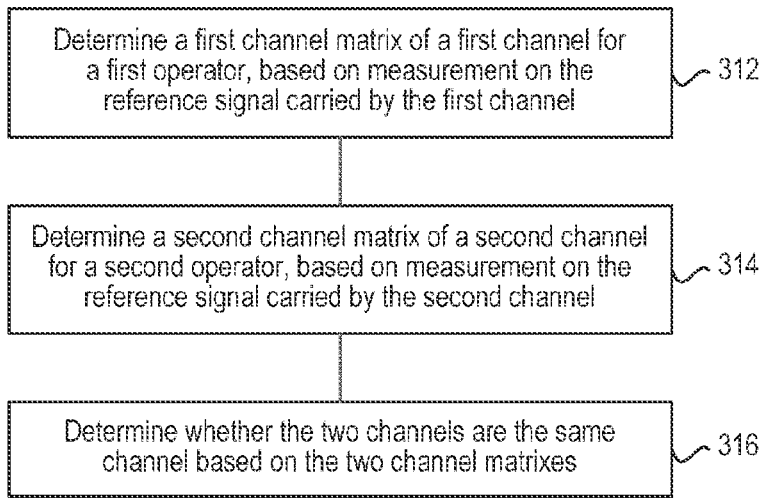

As another option, block 202 may be implemented as blocks 312-316 of FIG. 3B. At block 312, the terminal device determines a first channel matrix (denoted as $H_1$) of a first channel for a first operator, based on measurement on a reference signal carried by the first channel. At block 314, the terminal device determines a second channel matrix (denoted as $H_2$) of a second channel for a second operator, based on measurement on the reference signal carried by the second channel. For example, as the terminal device is connected to the two operators, it may be configured by radio resource control (RRC) (re)configurations and measurement configurations from the two operators, respectively. With the RRC (re)configuration, the terminal device may know the channel carrying the reference signal to be measured. The reference signal may be a channel state information reference signal (CSI-RS) or a tracking reference signal (TRS). At block 316, the terminal device determines whether the two channels are the same channel based on the two channel matrixes. If the two channels are the same channel, it may be determined that frequency bands used by the two operators for the cell are overlapped. If the two channels are not the same channel, it means they are experiencing different fading. For example, blocks 312-316 may be performed periodically to evaluate the similarity between the channels.

Figure 4:
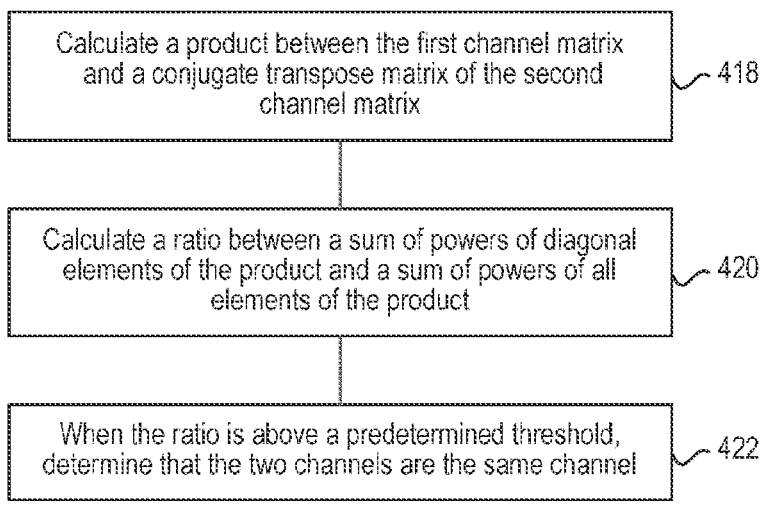
FIG. 4 is a flowchart for explaining the method of FIG. 3B.

As an exemplary example, block 316 may be implemented as blocks 418-422 of FIG. 4. At block 418, the terminal device calculates a product between the first channel matrix and a conjugate transpose matrix of the second channel matrix. This may be denoted as $A=H_1 H_2^H$. At block 420, the terminal device calculates a ratio between a sum (denoted as $P_d$) of powers of diagonal elements of the product and a sum (denoted as P) of powers of all elements of the product. When the ratio (denoted as $P_d/P$) is above (greater than or equal to) a predetermined threshold, the terminal device determines that the two channels are the same channel at block 422. The threshold may be determined by considering various factors of the system. Simulations may be done to evaluate the performance loss against different values of the threshold to determine a proper value. Note that there might be some delay between the two channels. It has been proven in field that the timing tolerance for relatively static terminal device is up to 20 ms. Also note that various existing techniques for evaluating the similarity between matrixes may be used instead.

Referring back to FIG. 2, when detecting that frequency bands used by the two operators for the cell are overlapped, the terminal device performs measurement on a reference signal from one of the two operators at least at the overlapped portion of the frequency bands at block 204. At block 206, the terminal device reports information about a result of the measurement to the two operators. With the measurement configuration described above, the terminal device may know what measurement result needed to be reported and when to report such result to the corresponding operator. For example, the measurement on the CSI-RS may be used for generating a CSI report which helps the base station's downlink transmission. The measurement on the CSI-RS may also be optionally used for helping the terminal device and the base station to do radio link monitoring. It may also be optionally used by the base station for sending handover command to the terminal device. The measurement on the TRS may help the terminal device to adjust time/frequency of the terminal device.

In the method shown in FIG. 2, since the reference signal from one of the two operators is measured and the result is reused for measurement reporting, the power consumption at the terminal device can be reduced. If the two operators share the same radio, 50% power saving at maximum can be expected from the perspectives of measurements and control channel monitoring. These two factors dominant the power saving of the terminal device in cases of non-heavy data traffic.

Blocks 204 and 206 may be performed depending on different cases of frequency band overlapping. For example, in case A of FIG. 5, since the two frequency bands are the same with each other, the measurement is performed at the same frequency band at block 204 and the information sent to the two operators at block 206 indicate the same result of the measurement. In other words, the terminal device may do only one measurement for multiple operators and reuse the same measurement for all. In case B of FIG. 5, since the overlapped portion of the frequency bands is the second frequency band, the measurement is performed at the first frequency band at block 204 and the information sent to the second operator at block 206 indicates part of the result of the measurement corresponding to the second frequency band. In other words, the terminal device may do measurement for the operator with the widest band and then extract the measurement result for the one with smaller band. In case C of FIG. 5, since the two frequency bands are staggered from each other with a portion overlapped therebetween, the measurement is performed at the overlapped portion at block 204 and the information sent to the two operators at block 206 contains the same result of the measurement. In other words, the terminal device may do only one measurement for the partial band overlapped by multiple operators.

Blocks 204 and 206 may also be performed depending on different cases of DRX configurations. The DRX configurations may be obtained from the RRC (re)configurations described above. For example, in case 1 of FIG. 6, DRX periods of the two operators are completely overlapped with each other. In this case, the measurement is performed at one of measurement opportunities for the two operators, which is closest to the earliest one of reporting occasions for the two operators. FIG. 7 illustrates an example for the case of periodic CSI reporting. As shown, CSI reporting occasions from different operators may be grouped and the earliest one may be taken. In addition, only the closest measurement opportunity prior to the earliest reporting occasion may be employed. As a result, the terminal device may ignore the measurement opportunities between the last CSI reporting and the measurement opportunity employed.

Figure 6:
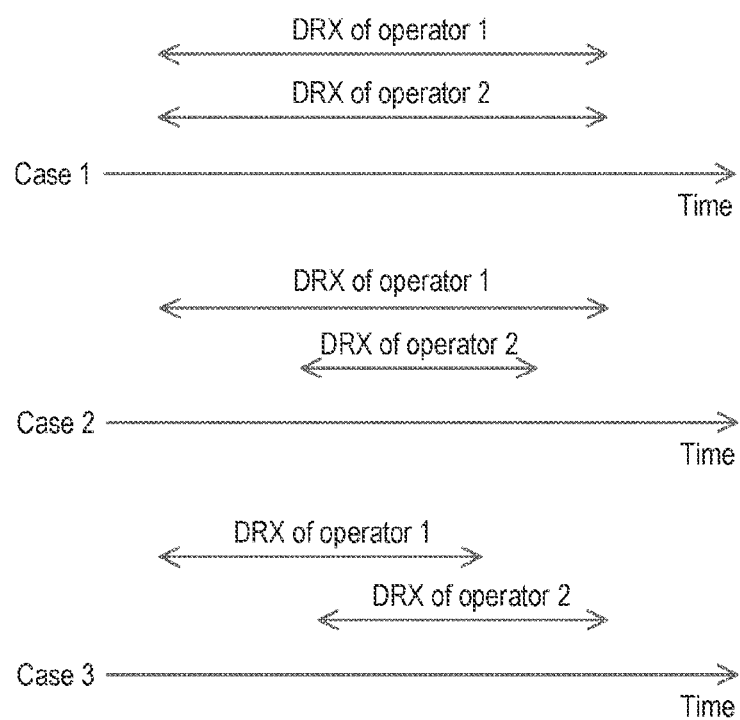
FIG. 6 is a diagram illustrating different cases of DRX configurations.
Figure 7:
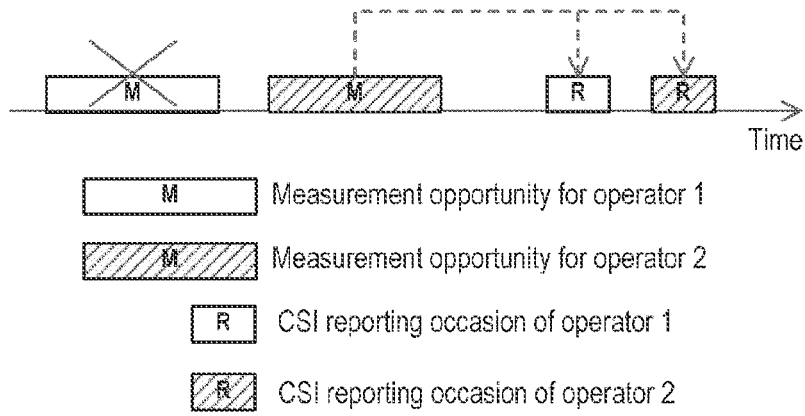
FIG. 7 is a diagram for explaining the method of FIG. 2.

In case 2 of FIG. 6, the second DRX period of the second operator falls within the first DRX period of the first operator For example, the first DRX period may be a multiple of the second DRX period. In this case, since the measurement reporting for the second operator needs to be more frequent than the first operator, the measurement is performed at a measurement opportunity for the second operator, without using measurement opportunity for the first operator. In case 3 of FIG. 6, DRX periods of the two operators are staggered from each other with a portion overlapped therebetween. In this case, the measurement is performed at a measurement opportunity for one of the two operators whose DRX period starts earlier. In this way, the measurement result obtained earlier for one operator may be reused for the other operator. Note that the above case 1 to case 3 in FIG. 6 may apply to case A and case C in FIG. 5. For case B, the measurement opportunity for the first operator is always used for performing the measurement.

Figure 8:
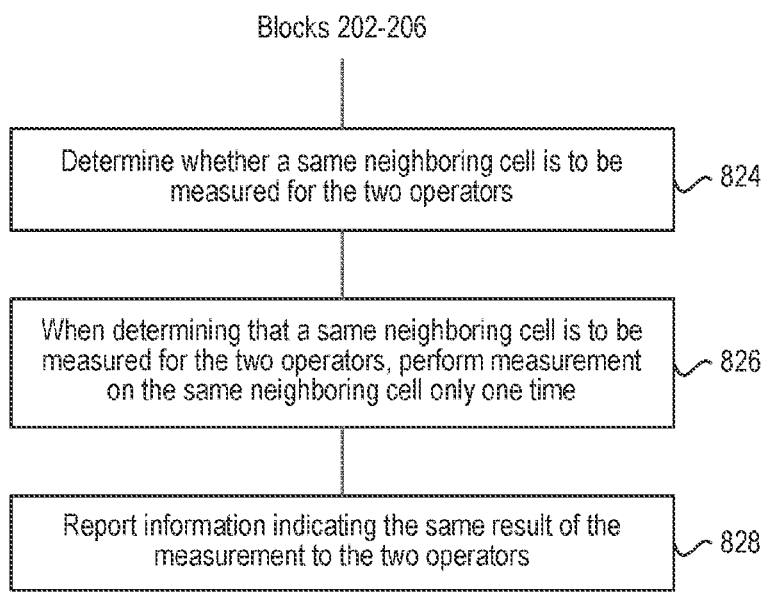
FIG. 8 is a flowchart illustrating a method implemented at a terminal device according to another embodiment of the disclosure.

FIG. 8 is a flowchart illustrating a method implemented at a terminal device according to another embodiment of the disclosure. As shown, the method comprises blocks 202-206 and 824-828. Blocks 202-206 have been described above and its details are omitted here. At block 824, the terminal device determines whether a same neighboring cell is to be measured for the two operators. Note that there may be one or more same neighboring cells to be measured for the two operators. This determination may be performed according to the carrier bands of neighboring cells. When determining that a same neighboring cell is to be measured for the two operators, the terminal device performs measurement on the same neighboring cell only one time at block 820. The measurement may comprise inter-frequency cell measurement and intra-frequency cell measurement. In the case of inter-frequency cell measurement, the measurement gap, measurement period and measurement offset may be obtained from the RRC (re)configuration described above. The measurement result obtained in a measurement gap for one operator may be reused for the other operator. At block 822, the terminal device reports information indicating the same result of the measurement to the two operators. With the method of FIG. 8, the power consumption at the terminal device can be further reduced.

Figure 9:
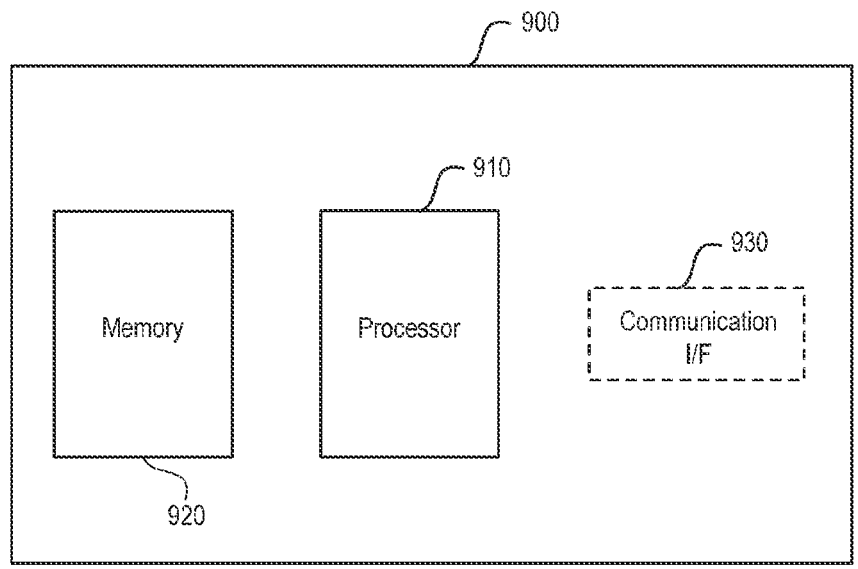
FIG. 9 is a block diagram showing an apparatus suitable for use in practicing some embodiments of the disclosure.

FIG. 9 is a block diagram showing an apparatus suitable for use in practicing some embodiments of the disclosure. For example, the access network node described above may be implemented through the apparatus 900. As shown, the apparatus 900 may include a processor 910, a memory 920 that stores a program, and optionally a communication interface 930 for communicating data with other external devices through wired and/or wireless communication.

The program includes program instructions that, when executed by the processor 910, enable the apparatus 900 to operate in accordance with the embodiments of the present disclosure, as discussed above. That is, the embodiments of the present disclosure may be implemented at least in part by computer software executable by the processor 910, or by hardware, or by a combination of software and hardware.

The memory 920 may be of any type suitable to the local technical environment and may be implemented using any suitable data storage technology, such as semiconductor based memory devices, flash memories, magnetic memory devices and systems, optical memory devices and systems, fixed memories and removable memories. The processor 910 may be of any type suitable to the local technical environment, and may include one or more of general purpose computers, special purpose computers, microprocessors, digital signal processors (DSPs) and processors based on multi-core processor architectures, as non-limiting examples.

Figure 10:
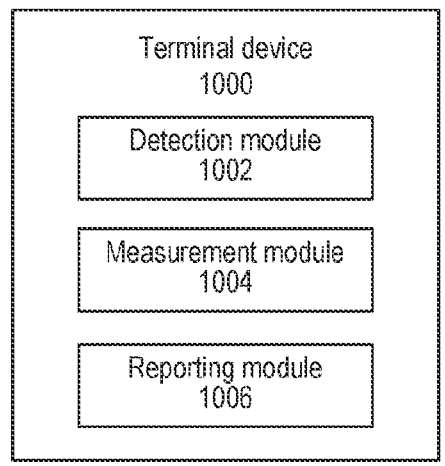
FIG. 10 is a block diagram showing a terminal device according to an embodiment of the disclosure.

FIG. 10 is a block diagram showing a terminal device according to an embodiment of the disclosure. As shown, the terminal device 1000 comprises a detection module 1002, a measurement module 1004 and a reporting module 1006. The detection module 1002 may be configured to detect, for a cell that is shared by two operators and to be measured by the terminal device, whether frequency bands used by the two operators for the cell are overlapped, as described above with respect to block 202. The measurement module 1004 may be configured to, when detecting that frequency bands used by the two operators for the cell are overlapped, perform measurement on a reference signal from one of the two operators at least at the overlapped portion of the frequency bands, as described above with respect to block 204. The reporting module 1006 may be configured to report information about a result of the measurement to the two operators, as described above with respect to block 206. The modules described above may be implemented by hardware, or software, or a combination of both.

Figure 11:
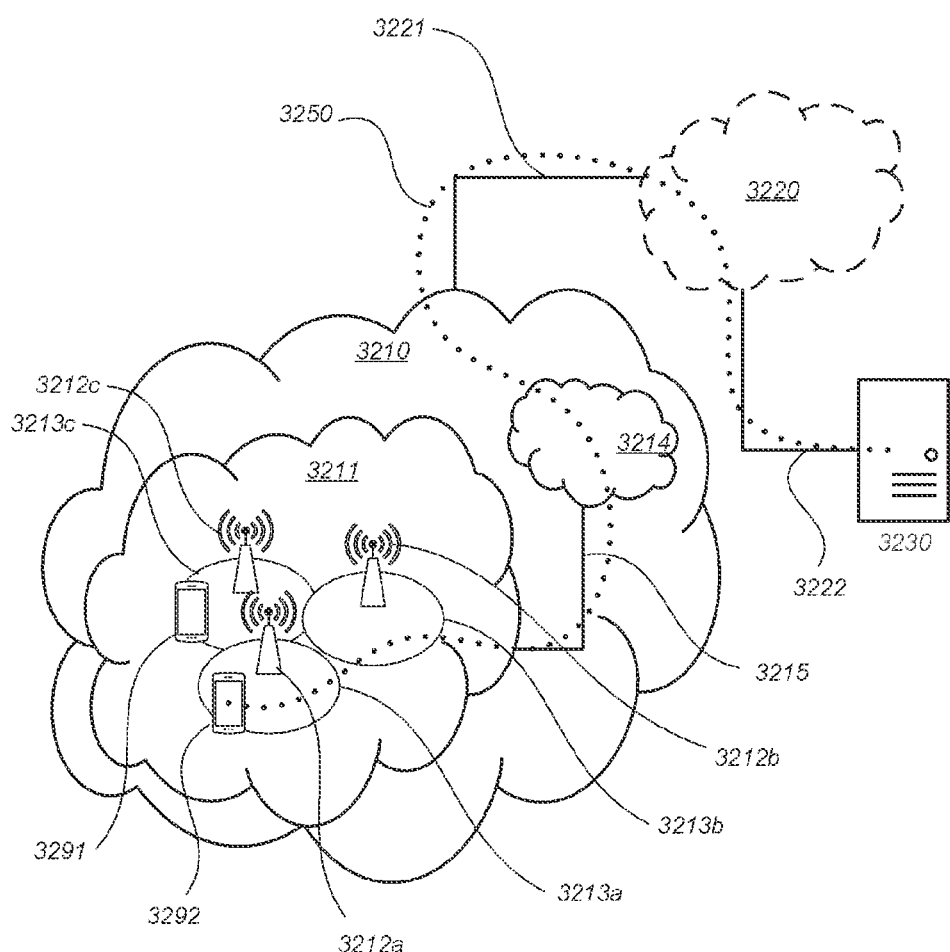
FIG. 11 is a diagram showing a telecommunication network connected via an intermediate network to a host computer in accordance with some embodiments.

With reference to FIG. 11, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise wo or more sub-networks (not shown).

The communication system of FIG. 11 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 12) served by base station 3320. Communication interface 3326 may be configured to facilitate connection 3360 to host computer 3310. Connection 3360 may be direct or it may pass through a core network (not shown in FIG. 12) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or nonhuman user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 12:
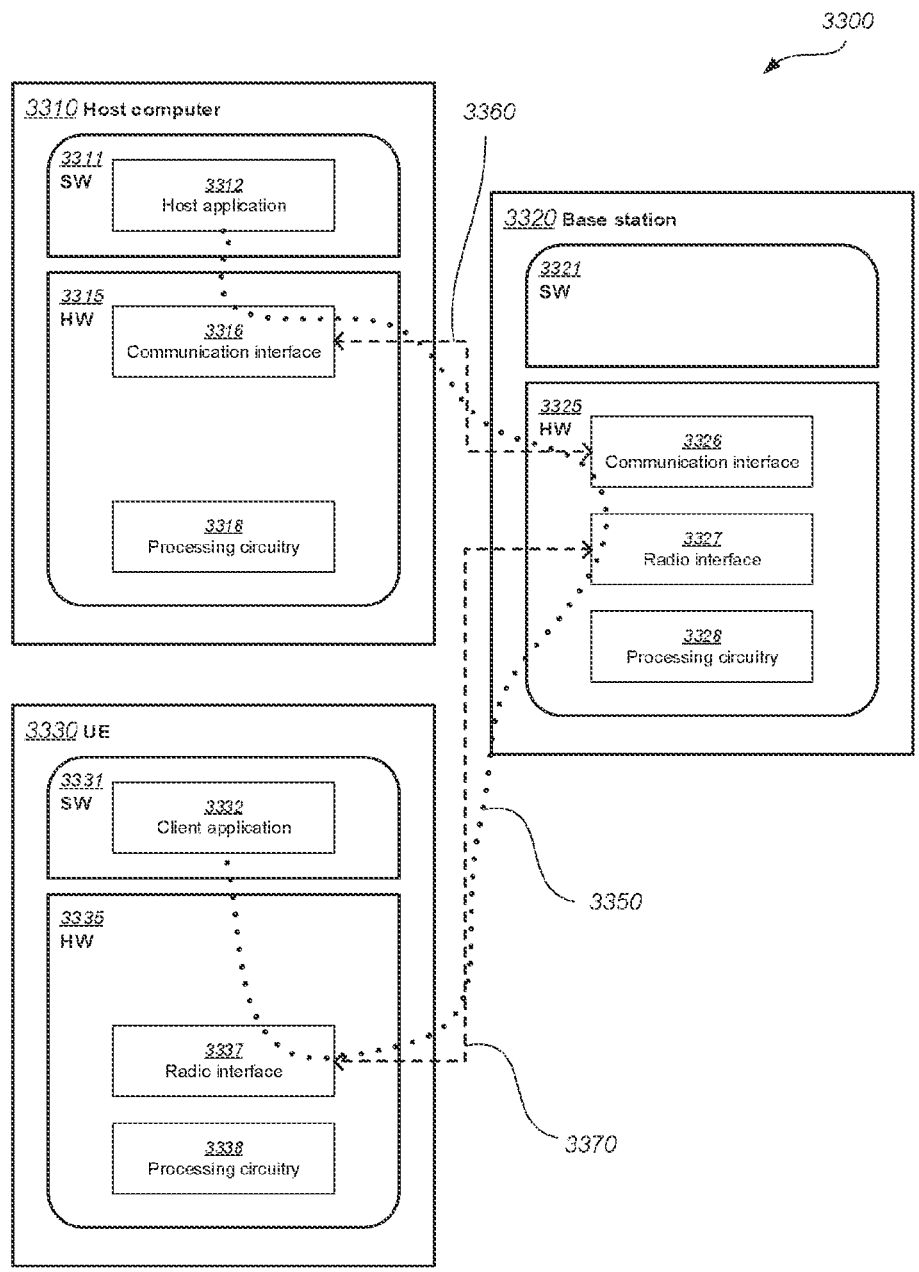
FIG. 12 is a diagram showing a host computer communicating via a base station with a user equipment in accordance with some embodiments.

It is noted that host computer 3310, base station 3320 and UE 3330 illustrated in FIG. 12 may be similar or identical to host computer 3230, one of base stations 3212*a*, 3212*b*, 3212*c* and one of UEs 3291, 3292 of FIG. 11, respectively. This is to say, the inner workings of these entities may be as shown in FIG. 12 and independently, the surrounding network topology may be that of FIG. 11.

In FIG. 12, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the power consumption.

A measurement procedure may be provided for the purpose of monitoring data rate, latency and other factors on which the one or more embodiments improve. There may further be an optional network functionality for reconfiguring, OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 13:
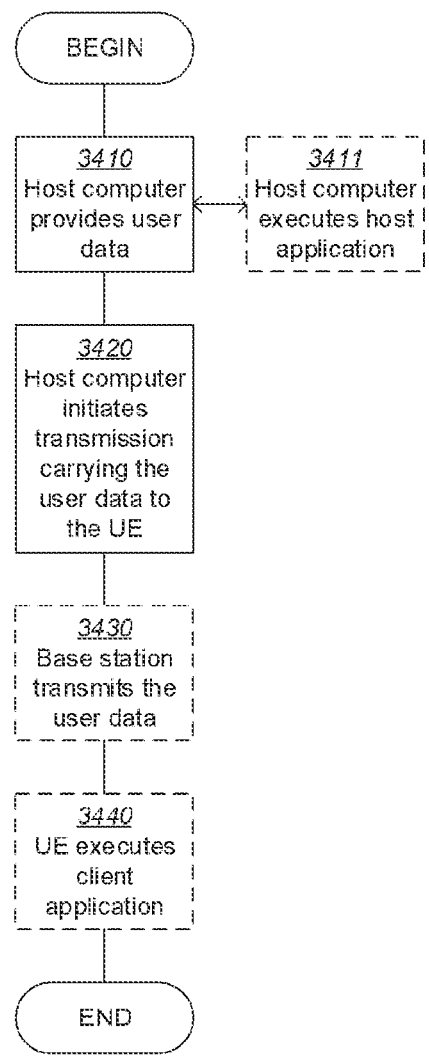
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 14:
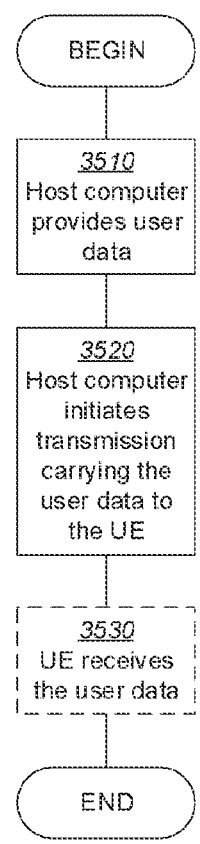
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 15:
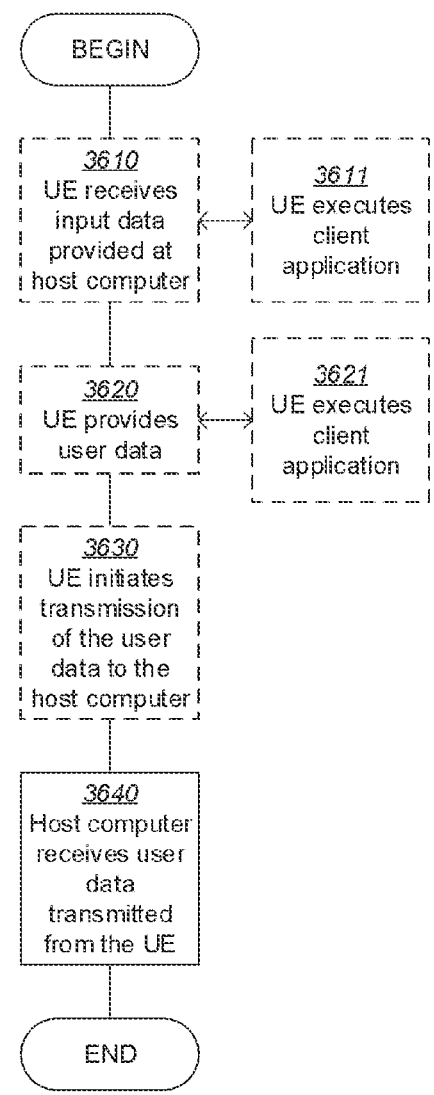
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 16:
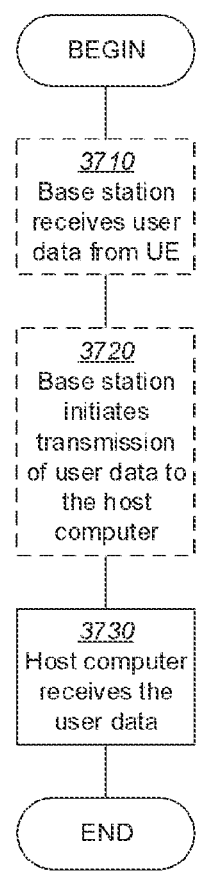
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The terminal device may detect, for a cell that is shared by two operators and to be measured by the terminal device, whether frequency bands used by the two operators for the cell are overlapped. When detecting that frequency bands used by the two operators for the cell are overlapped, the terminal device may perform measurement on a reference signal from one of the two operators at least at the overlapped portion of the frequency bands. The terminal device may report information about a result of the measurement to the two operators.

In an embodiment of the disclosure, the method may further comprise, at the terminal device, receiving the user data from the base station.

According to another aspect of the disclosure, there is provided a communication system including a host computer comprising processing circuitry configured to provide user data and a communication interface configured to forward user data to a cellular network for transmission to a terminal device. The terminal device may comprise a radio interface and processing circuitry. The processing circuitry of the terminal device may be configured to detect, for a cell that is shared by two operators and to be measured by the terminal device, whether frequency bands used by the two operators for the cell are overlapped. The processing circuitry of the terminal device may be further configured to, when detecting that frequency bands used by the two operators for the cell are overlapped, perform measurement on a reference signal from one of the two operators at least at the overlapped portion of the frequency bands. The processing circuitry of the terminal device may be further configured to report information about a result of the measurement to the two operators.

In an embodiment of the disclosure, the communication system may further include the terminal device.

In an embodiment of the disclosure, the cellular network may further include a base station configured to communicate with the terminal device.

In an embodiment of the disclosure, the processing circuitry of the host computer may be configured to execute a host application, thereby providing the user data. The processing circuitry of the terminal device may be configured to execute a client application associated with the host application.

According to another aspect of the disclosure, there is provided a method implemented in a communication system including a host computer, a base station and a terminal device. The method may comprise, at the host computer, receiving user data transmitted to the base station from the terminal device. The terminal device may detect, for a cell that is shared by two operators and to be measured by the terminal device, whether frequency bands used by the two operators for the cell are overlapped. When detecting that frequency bands used by the two operators for the cell are overlapped, the terminal device may perform measurement on a reference signal from one of the two operators at least at the overlapped portion of the frequency bands. The terminal device may report information about a result of the measurement to the two operators.

In an embodiment of the disclosure, the method may further comprise, at the terminal device, providing the user data to the base station.

In an embodiment of the disclosure, the method may further comprise, at the terminal device, executing a client application, thereby providing the user data to be transmitted. The method may further comprise, at the host computer, executing a host application associated with the client application.

In an embodiment of the disclosure, the method may further comprise, at the terminal device, executing a client application. The method may further comprise, at the terminal device, receiving input data to the client application. The input data may be provided at the host computer by executing a host application associated with the client application. The user data to be transmitted may be provided by the client application in response to the input data.

According to another aspect of the disclosure, there is provided a communication system including a host computer comprising a communication interface configured to receive user data originating from a transmission from a terminal device to a base station. The terminal device may comprise a radio interface and processing circuitry. The processing circuitry of the terminal device may be configured to detect, for a cell that is shared by two operators and to be measured by the terminal device, whether frequency bands used by the two operators for the cell are overlapped. The processing circuitry of the terminal device may be further configured to, when detecting that frequency bands used by the two operators for the cell are overlapped, perform measurement on a reference signal from one of the two operators at least at the overlapped portion of the frequency bands. The processing circuitry of the terminal device may be further configured to report information about a result of the measurement to the two operators.

In an embodiment of the disclosure, the communication system may further include the terminal device.

In an embodiment of the disclosure, the communication system may further include the base station. The base station may comprise a radio interface configured to communicate with the terminal device and a communication interface configured to forward to the host computer the user data carried by a transmission from the terminal device to the base station.

In an embodiment of the disclosure, the processing circuitry of the host computer may be configured to execute a host application. The processing circuitry of the terminal device may be configured to execute a client application associated with the host application, thereby providing the user data.

In an embodiment of the disclosure, the processing circuitry of the host computer may be configured to execute a host application, thereby providing request data. The processing circuitry of the terminal device may be configured to execute a client application associated with the host application, thereby providing the user data in response to the request data.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that, the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the figures may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:
   detecting, for a cell that is shared by two operators and to be measured by the terminal device, whether frequency bands used by the two operators for the cell are overlapped;
   when detecting that frequency bands used by the two operators for the cell are overlapped, performing measurement on a reference signal from one of the two operators at least at the overlapped portion of the frequency bands;
   reporting information about a result of the measurement to the two operators;
   determining whether a same neighboring cell is to be measured for the two operators;
   when determining that a same neighboring cell is to be measured for the two operators, performing measurement on the same neighboring cell only one time; and
   reporting information indicating the same result of the measurement to the two operators.

2. The method according to claim 1, wherein the cell to be measured by the terminal device is a cell serving the terminal device, or a neighboring cell of the cell serving the terminal device.

3. The method according to claim 1, wherein the two frequency bands are the same with each other;
   wherein the measurement is performed at the same frequency band; and
   wherein the information sent to the two operators indicates the same result of the measurement.

4. The method according to claim 1, wherein the frequency bands are a first frequency band used by a first operator and a second frequency band used by a second operator, and the overlapped portion of the frequency bands is the second frequency band;
   wherein the measurement is performed at the first frequency band; and
   wherein the information sent to the second operator indicates part of the result of the measurement corresponding to the second frequency band.

5. The method according to claim 1, wherein the two frequency bands are staggered from each other with a portion overlapped therebetween;
   wherein the measurement is performed at the overlapped portion; and wherein the information sent to the two operators contains the same result of the measurement.

6. The method according to claim 1, wherein discontinuous reception (DRX) periods of the two operators are completely overlapped with each other; and
wherein the measurement is performed at one of measurement opportunities for the two operators, which is closest to the earliest one of reporting occasions for the two operators.

7. The method according to claim 1, wherein the frequency bands are a first frequency band used by a first operator and a second frequency band used by a second operator, and a second DRX period of the second operator falls within a first DRX period of the first operator; and
wherein the measurement is performed at a measurement opportunity for the second operator, without using measurement opportunity for the first operator.

8. The method according to claim 1, wherein DRX periods of the two operators are staggered from each other with a portion overlapped therebetween; and
wherein the measurement is performed at a measurement opportunity for one of the two operators whose DRX period starts earlier.

9. The method according to claim 1, wherein detecting whether the frequency bands are overlapped comprises:
obtaining, from a server, information about radio and spectrum sharing; and
determining whether the frequency bands are overlapped based on the obtained information.

10. The method according to claim 1, wherein detecting whether the frequency bands are overlapped comprises:
determining a first channel matrix of a first channel for a first operator, based on measurement on the reference signal carried by the first channel;
determining a second channel matrix of a second channel for a second operator, based on measurement on the reference signal carried by the second channel; and
determining whether the two channels are the same channel based on the two channel matrixes.

11. The method according to claim 10, wherein determining whether the two channels are the same channel based on the two channel matrixes comprises:
calculating a product between the first channel matrix and a conjugate transpose matrix of the second channel matrix;
calculating a ratio between a sum of powers of diagonal elements of the product and a sum of powers of all elements of the product; and
when the ratio is above a predetermined threshold, determining that the two channels are the same channel.

12. The method according to claim 1, wherein the reference signal is a channel state information reference signal (CSI-RS), or a tracking reference signal (TRS).

13. A terminal device comprising:
at least one processor; and
at least one memory, the at least one memory containing instructions executable by the at least one processor, whereby the terminal device is operative to:
detect, for a cell that is shared by two operators and to be measured by the terminal device, whether frequency bands used by the two operators for the cell are overlapped;
when detecting that frequency bands used by the two operators for the cell are overlapped, perform measurement on a reference signal from one of the two operators at least at the overlapped portion of the frequency bands;
report information about a result of the measurement to the two operators;
determine whether a same neighboring cell is to be measured for the two operators;
when determining that a same neighboring cell is to be measured for the two operators, perform measurement on the same neighboring cell only one time; and
report information indicating the same result of the measurement to the two operators.

14. The terminal device according to claim 13, wherein the cell to be measured by the terminal device is a cell serving the terminal device, or a neighboring cell of the cell serving the terminal device.

15. The terminal device according to claim 13, wherein the two frequency bands are the same with each other;
wherein the measurement is performed at the same frequency band; and
wherein the information sent to the two operators indicates the same result of the measurement.

16. The terminal device according to claim 13, wherein the frequency bands are a first frequency band used by a first operator and a second frequency band used by a second operator, and the overlapped portion of the frequency bands is the second frequency band;
wherein the measurement is performed at the first frequency band; and
wherein the information sent to the second operator indicates part of the result of the measurement corresponding to the second frequency band.

17. The terminal device according to claim 13, wherein the two frequency bands are staggered from each other with a portion overlapped therebetween;
wherein the measurement is performed at the overlapped portion; and
wherein the information sent to the two operators contains the same result of the measurement.

18. The terminal device according to claim 13, wherein discontinuous reception (DRX) periods of the two operators are completely overlapped with each other; and
wherein the measurement is performed at one of measurement opportunities for the two operators, which is closest to the earliest one of reporting occasions for the two operators.

* * * * *